United States Patent [19]

Tanaka et al.

[11] Patent Number: 4,845,582
[45] Date of Patent: Jul. 4, 1989

[54] DISC CARTRIDGE

[75] Inventors: Kimio Tanaka; Haruo Shiba, both of Nagano, Japan

[73] Assignee: TDK Corporation, Japan

[21] Appl. No.: 942,622

[22] Filed: Dec. 16, 1986

[30] Foreign Application Priority Data

Dec. 18, 1985 [JP] Japan .............................. 60-194552[U]
Dec. 18, 1985 [JP] Japan .............................. 60-194553[U]

[51] Int. Cl.⁴ ............................................. G11B 23/03
[52] U.S. Cl. .................................................. 360/133
[58] Field of Search .......................................... 360/133

[56] References Cited

U.S. PATENT DOCUMENTS

| | | | |
|---|---|---|---|
| 3,416,150 | 12/1968 | Lindberg ........................ | 360/133 X |
| 3,529,301 | 9/1970 | Hiruta ............................. | 360/133 X |
| 4,499,996 | 2/1985 | Coyle .............................. | 360/133 X |
| 4,692,831 | 9/1987 | Suzuki .............................. | 360/97 X |

FOREIGN PATENT DOCUMENTS 0137965 4/1985 European Pat. Off. ............ 360/133

*Primary Examiner*—A. J. Heinz
*Attorney, Agent, or Firm*—Steinberg & Raskin

[57] ABSTRACT

A disc cartridge capable of holding a disc in a casing in a state of floating in a space in the casting to keep it in noncontact with the casing when the disc cartridge is not used. The disc cartridge includes an actuator arranged in a casing receiving a disc therein to releasable lock a shutter for a window and a disc receiver arranged in the casing and operatively connected to the actuator to selectively receive therein a part of a peripheral portion of the disc. The actuator is arranged to be slidable in a longitudinal direction of the disc cartridge to cause the disc receiver to be approachably moved with respect to the disc, so that the disc receiver may be engaged with the disc to rearwardly force the disc while keeping the disc in noncontact with the casing when the shutter is actuated to close the window and disengaged from the disc when the shutter is actuated to open the window.

20 Claims, 6 Drawing Sheets

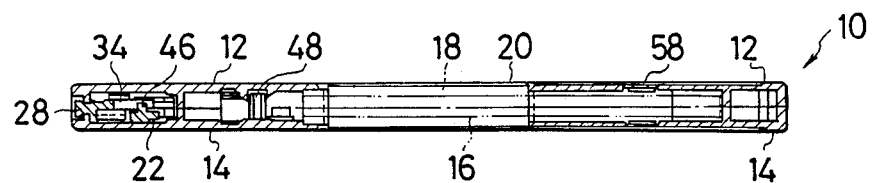
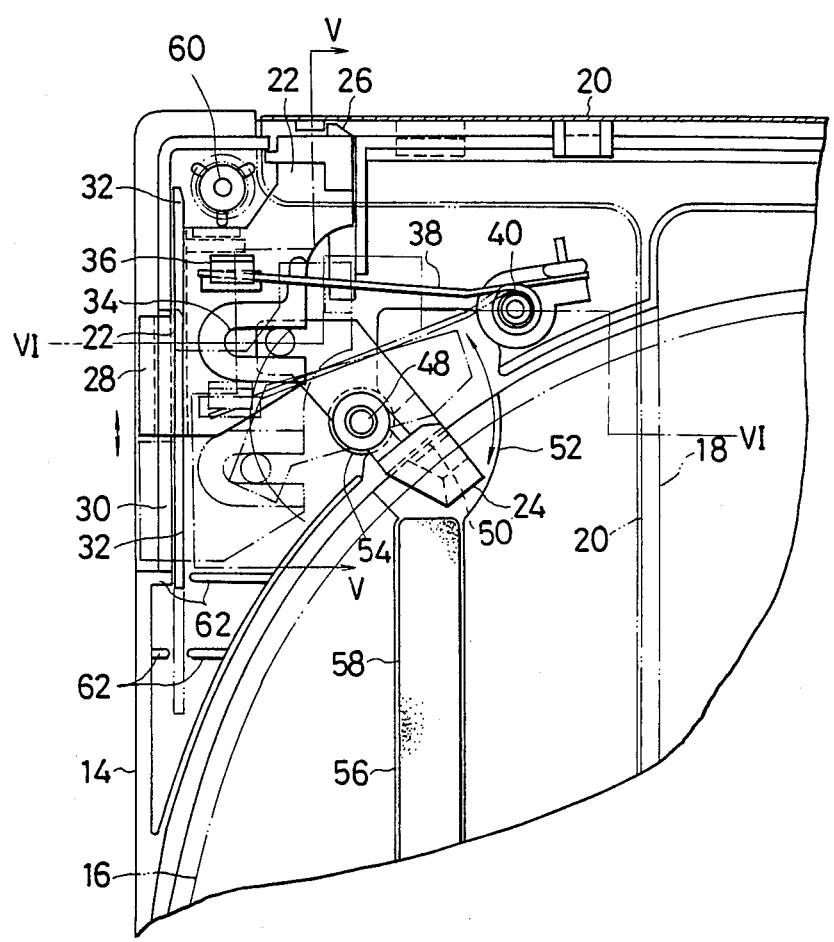

4,845,582

DISC CARTRIDGE

BACKGROUND OF THE INVENTION

This invention relates to a disc cartridge, and more particularly to a disc cartridge which has a hard disc, particularly, a double-sided type hard disc housed in a casing.

In general, a disc-type data recording carrier such as a compact disc (CD), a video disc (LD) or the like is used in a manner to be removed from a packing case and set in a recording and/or reproducing equipment.

Conventionally, it has been desirable to protect such a disc type recording carrier from environment because it is not only easy to become covered with dust and damaged but adversely affected due to a variation in temperature. For this purpose, the use of an envelope such as a tray, a casing or the like has been proposed to protect the disc. Unfortunately, such a conventional envelope is not suitable for the protection of a double-sided hard disc, because the the housing of the disc in a storage space defined in the envelope causes the disc to be contacted by the envelope. Also, the envelope causes the disc to be contacted by an inner surface thereof during the storage or transportation. Thus, the use of the envelope results in damage and/or pollution of the disc. Also, the conventional envelope fails to prevent the disc from being exposed to a variation in temperature and is hard in handling.

Accordingly, there is a need for a disc cartridge which is capable of keeping a disc in noncontact with a casing during the storage and transportation as well as constantly housing a disc therein with safely to prevent pollution and damage of the disc.

SUMMARY OF THE INVENTION

Briefly speaking, in accordance with the present invention, a disc cartridge is provided. The disc cartridge includes a casing comprising an upper cover plate and a lower cover plate joined together, in which a disc is rotatably housed. Also, the disc cartridge includes a shutter arranged to operate a window provided at the casing to insert a recording and/or reproducing head therethrough into the disc cartridge. The casing is provided with an actuator adapted to releasably lock the shutter. The disc cartridge also includes a disc receiver which is arranged in the casing and connected to the actuator to selectively receive therein a part of a peripheral portion of the disc. The actuator is arranged to be slidable in a longitudinal direction of the disc cartridge to cause the disc receiver to be approachably moved with respect to the disc, so that the disc receiver may be engaged with the disc to rearwardly force the disc while floating the disc in a space defined in the casing to keep the disc in noncontact with the casing when the shutter is actuated to close the window and disengaged from the disc when the shutter is actuated to open the window.

Accordingly, it is an object of the present invention to provide a disc cartridge which is capable of preventing a disc housed in a casing from being adversely affected.

It is another object of the present invention to provide a disc cartridge which is capable of safely housing a disc in a casing without damaging the disc.

It is a further object of the present invention to provide a disc cartridge which is capable of preventing a recording surface of a disc from being adversely affected during storage or transportation of the disc cartridge.

It is a further object of the present invention to provide a disc cartridge which is capable of preventing the damage and pollution of a disc housed in a casing.

It is still another object of the presentr invention to provide a disc cartridge which is capable of preventing the unsteadiness of a disc in a casing.

It is yet another object of the present invention to provide a disc cartridge which is capable of readily accomplishing the selective engagement of a disc with a disc receiver.

It is still a further object of the present invention to provide a disc cartridge which accomplished the above-noted objects with a simple structure.

Still other objects and advantages of the invention will in part be clear and will in part be apparent from the specification.

The invention accordingly comprises the features of construction, combination of elements, and arrangement of parts which will be exemplified in the construction hereinafter set forth.

BRIEF DESCRIPTION OF THE DRAWINGS

For a fuller understanding of the invention, reference is made to the following description taken in connection with the accompanying drawings in which like reference numerals designated like or corresponding parts throughout; wherein:

FIG. 2 is a sectional view taken along line II—II of FIG. 1;

FIG. 3 is partly enlarged view showing an essential part of the disc cartridge shown in FIG. 1;

FIGS. 7 to 9 illustrate a modification of the disc cartridge shown in FIG. 1, in which FIG. 7 is an enlarged sectional view showing a part of a disc receiver used in the modification, FIG. 8 is a perspective view showing the disc receiver, and FIG. 9 is a sectional view showing a rear portion of a casing used in the modification and corresponding to a view substantially taken along line IX—IX of FIG. 1.

DETAILED DESCRIPTION OF THE PREFERRED EMBODIMENT

Now, a disc cartridge according to the present invention will be described hereinafter with reference to the accompanying drawings.

Figure 1:
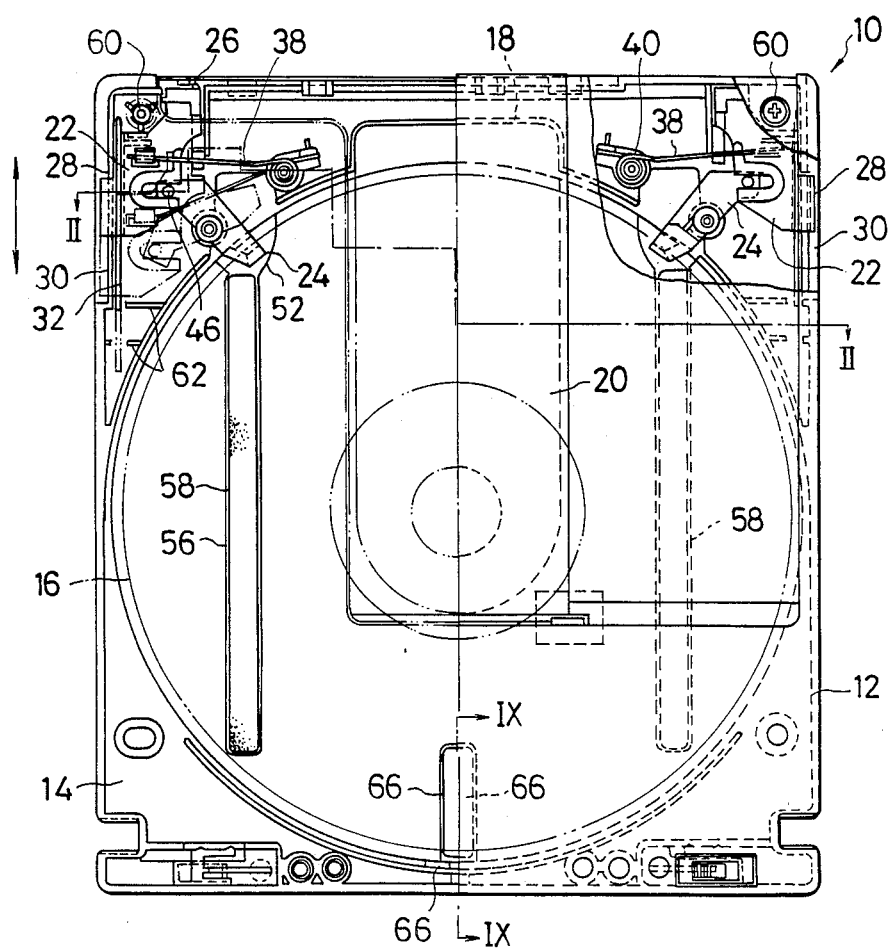
FIG. 1 is a partly cutaway plan view showing an embodient of a disc cartridge according to the present invention.

FIG. 1 shows an embodiment of a disc cartridge according to the present invention.

A disc cartridge of the illustrated embodiment, as shown in FIGS. 1 to 3, includes a casing 10 comprising an upper cover plate 12, a lower cover plate 14 joined together so as to define a space therein, and a disc 16 received or housed in the casing 10. The casing 10 is formed with a window 18 for inserting a recording and reproducing head (not shown) therethrough into the casing 10. The window 18 is operated by a shutter 20. Also, the disc cartridge includes a pair of actuators 22 arranged in the casing 10 for releasably locking the shutter 20 and a disc receiver 24 provided in the casing 10 and operatively connected to or engaged with each of the actuators 22. The disc receiver 24 is adapted to selectively receive a part of a peripheral portion of the disc 16 or a part of each of upper and lower surfaces and a peripheral end surface of the disc 16. The actuator 22 is arranged to be slidable in a longitudinal direction of the cartridge indicated by arrows in FIG. 1 and the disc receiver 24 is adapted to be approachably moved with respect to the disc 16 when the actuator 22 is slidably moved; so that when the shutter 20 is actuated to close the window 18, the disc 16 may be engaged with the disc receiver 24 to be forced toward a rear side end of the casing 10 while being held at substantially a center in a width direction of the casing, to thereby be kept at a state of floating in a space defined in the casing 10, whereas when the shutter 20 is actuated to open the window 18, the disc receiver 24 may be disengaged from the disc 16 to prepare the disc for engagement with a recording and/or reproducing head which is then inserted through the opened window into the cartridge.

In the illustrated embodiment, the shutter 20 comprises a plate member of a substantially U-shape which is movably fitted on the casing 10 so as to be slidable along the upper and lower cover plates 12 and 14.

Figure 4:
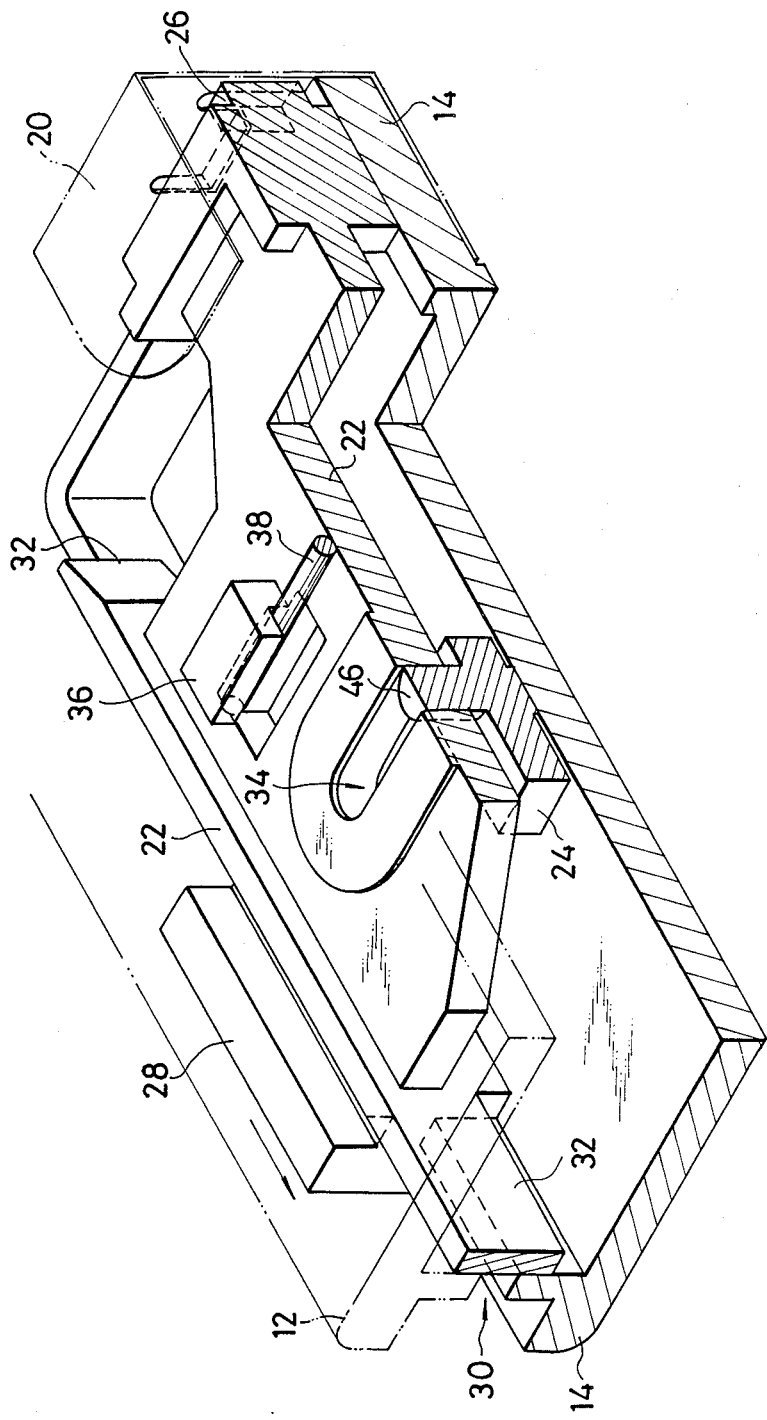
FIG. 4 is a partial perspective view showing an actuator.
Figure 5:
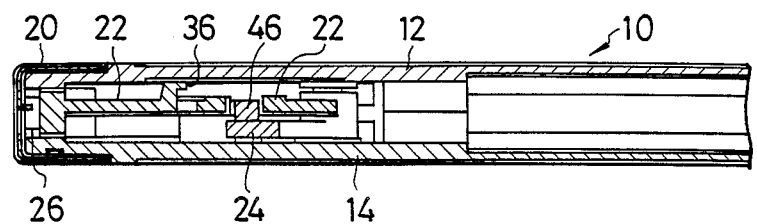
FIG. 5 is a sectional view taken along line V—V of FIG. 3.
Figure 6:
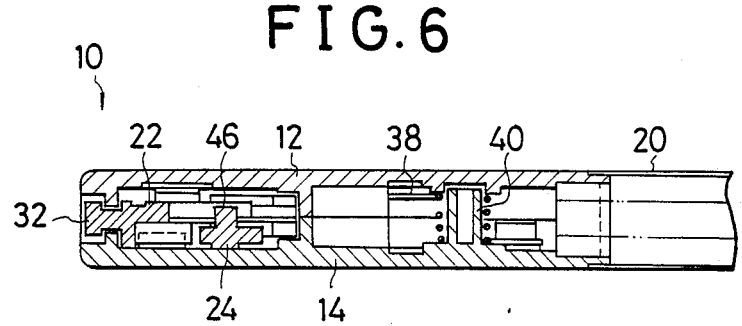
FIG. 6 is a sectional view taken along line VI—VI of FIG. 3.

The actuators 22, as shown in FIG. 1, are formed to by symmetrical with each other, and arranged adjacent to both sides of a front portion of the casing 10 in a manner to be not only opposite to each other but symmetrical along a longitudinal axis of the cartridge and slidable with respect to the casing 10. Also, the actuators each serves as an actuating lever to drive operation sections of the disc cartridge. More particularly, each of the actuators 22, as shown in FIG. 4, is provided at a front end thereof with lock means 26, which comprise, in the illustrated embodiment, a hook-like member integrally formed at the front end of the actuator 22 and is securely engaged with the shutter 20. The actuator 22 is also provided on one side or an outside thereof with actuating means 28 which comprise, in the illustrated embodiment, a projection integrally formed on the outside of the actuator and outwardly extending through an horizontally extending cutout formed at a side wall of the casing 10. Also, the actuator 22 has cover means 32 integrally provided on the one side thereof so as to extend in a longitudinal direction thereof. The cover means 32 are formed to thoroughly cover the cutout 30 formed at the side wall of the casing 10 to function as a dust protective cover for preventing any dust from entering the casing 10 through the cutout 30. In addition, the actuator 22 is formed on the other side thereof with a guide groove 34 of a substantially U-shape which serves as movement transmission means for transmitting sliding movement of the actuator to the disc receiver 24 as described hereinafter. Further, the actuator 22 is provided on an upper surface thereof with a spring bearing 36 as shown in FIG. 4 which is engaged with one end of a spring 38 held at the other end thereof on a spring holder 40 fixed on the casing 10, so that the actuator may be forced toward a front end of the casing.

Likewise, the disc receivers 24, as shown in FIG. 1, are formed symmetrical with each other. Each of the disc receivers 24 is generally formed into a shape like a lever as shown in FIGS. 1 and 3 and provided at one end thereof with a receiver body 42. The receiver body 42 is formed into a substantially U-shape to define therein a recess similar to that designated by reference numeral 44 in FIG. 4. The so-formed receiver body 42 is positioned adjacent to a peripheral portion of the disc 16 to selectively receive a part of the peripheral portion in the recess as shown in FIG. 1 and 3 and also act as an elevator for lifting the disc 16. The disc receiver 24 is also provided at the other end thereof with a guide pin 46 actuating as operative connection means, which is loosely fitted in the guide groove 34 of the actuator 22 to connect the disc receiver 24 to the actuator 22. The disc receiver 24 is movably supported at a middle portion thereof on a pivot pin 48 so as to be rotatable about the pin 48 and vertically movable along the pin 48. The receiver body 42 preferably has an elastic member 50 arranged on a portion thereof contacting with the peripheral portion of the disc 16 such as an inner surface of the recess, as shown in FIG. 3. The elastic member 50 serves to prevent unsteadiness and damage of the disc in the casing 10 and may be formed of, for example, rubber, a soft plastic material such as polyethylene, polypropylene or vinyl chloride, or the like. Such an elastic member may be arranged on upper and lower surfaces of the recess of the receiver body 42.

In the illustrated embodiment, the guide pin 46 is provided at the disc receiver 24 and the guide groove 34 is formed at the actuator 22. However, the guide pin 46 and guide groove 34 may be provided at the actuator 22 and disc receiver 24, respectively.

Also, in the illustrated embodiment, the spring 38 may comprise a coiled spring stretchedly arranged in the sliding direction of the actuator 22 or between the disc receiver 24 operatively connected to the actuator 22 and the casing 10. Alternatively, it may comprise a coiled spring wound on the pivot pin 48 of the disc receiver 24. Each of such constructions causes the actuator 22 to be forced toward the front end of the casing 10.

The casing is formed on each of upper and lower inner surfaces thereof with a pair of recesses 52 so as to positionally correspond to the disc receivers. The recess 52 serves to ensure the smooth movement of the disc receiver. The disc receiver 24 is supported on a holder 54. Also, the bottom surface of the casing 10 is formed with a pair of elongated grooves 56, on each of which a sheet 58 exhibiting lubricating properties is sticked. Reference numerals 60 and 62 designated a bolt and a rib, respectively.

Now, the manner of operation of the disc cartridge of the illustrated embodiment constructed as described above will be described hereinafter with reference to FIGS. 1 to 6.

When the disc cartridge is inserted in a disc player (not shown) for the operation, the actuating means or projection 28 of the actuator 22 projecting through the cutout 30 of each of the side plates of the casing 10 is engaged with a projection provided at an insertion port of the disc player to be rearwardly slided along the cutout 30. The sliding of the projection 28 causes the shutter 20 to be released from the lock means or hook-like member 26, so that the shutter may be moved in a direction of opening the window 18 by means of a shutter actuating mechanism of the disc player. Concurrently, the disc receiver 24 is pivotally moved about the pivot pin 48 due to the sliding of the actuator 22 to release the disc 16 therefrom, resulting in the disc 16 being safely supported on the lubricating sticked sheet 58 and then operatively engaged with a disc driving mechanism of the disc player.

When, the disc cartridge is to be removed from the disc player, the disc 16 is first disengaged from the disc driving mechanism of the disc player to be put on the lubricating sticked sheet 58 and then the shutter 20 is moved by means of the shutter actuating mechanism of the disc player to close the window 18. Then, the disc cartridge is removed from the disc player, so that the actuator 22 may be slided toward a front end of the disc cartridge by means of the spring 38 to actuate the disc receiver 24, to thereby fit a part of the disc 16 in the receiver body 42. This results in the disc 16 being forced toward the rear end of the casing 10 while being held at a state of floating in the the space in the casing 10. Simultaneously, the lock means 26 of the actuator 22 actuates to keep the shutter 20 closed.

Figure 7:
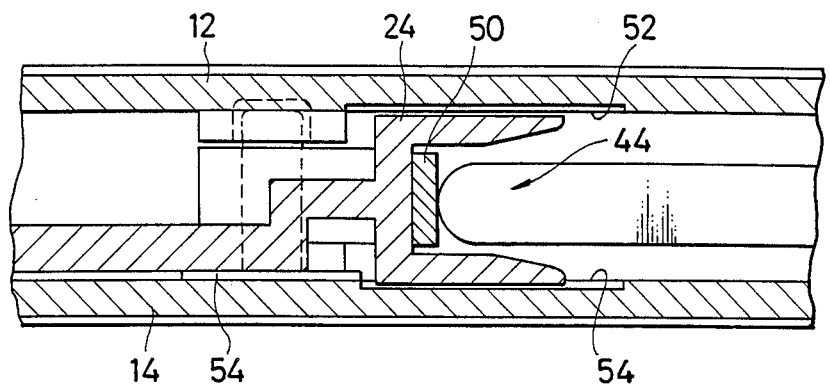
Figure 8:
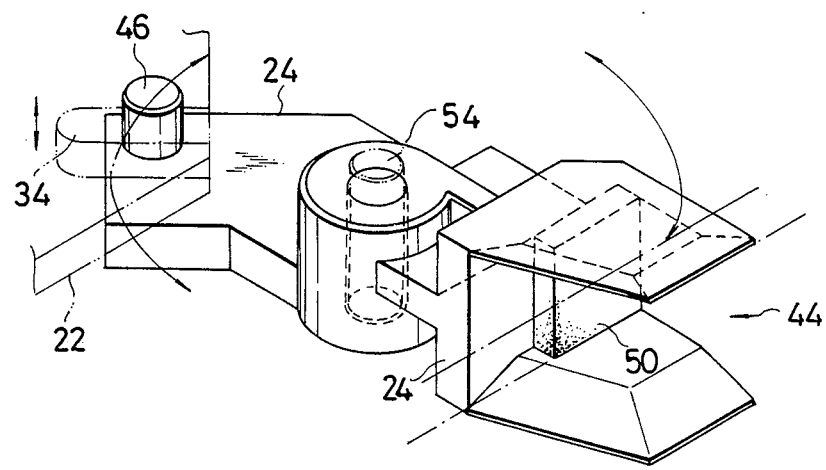
Figure 9:
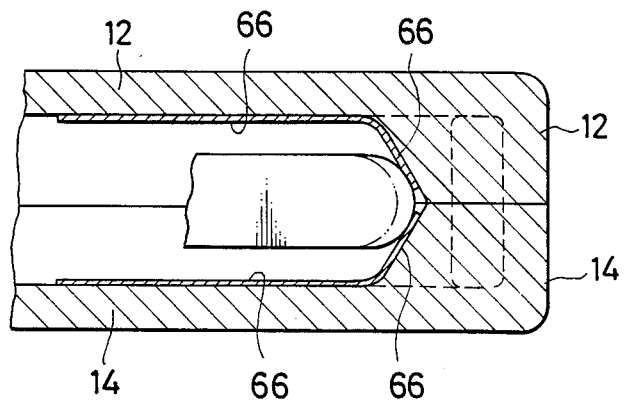

The disc cartridge shown in FIGS. 1 to 6 may be modified as shown in FIGS. 7 to 9.

In the modification, as shown in FIGS. 7 and 8, a receiver body 42 of a disc receiver 24 is formed to define therein a recess 44 of which a distal end portion or inlet portion is vertically enlarged, to thereby facilitate the insertion and removal of a disc 16 with respect to the recess 44.

Also, in the modification, as shown in FIG. 9, a casing 10 is formed at a rear end thereof into a substantially sideways V-shape, so that the rear end may be tapered. Such construction facilitates the positioning of the disc 16 at a center in the casing 10 because it is guided along along the tapered rear end. This results in the disc 16 being located at positions indicated at two-dot chain lines and solid lines in FIG. 9 when the disc cartridge is charged in a disc player and removed therefrom, respectively. Also, the modification may be constructed in a manner such that a disc holding material 66 which exhibits lubricating properties is applied to the tapered rear end of the casing 10 to ensure the safety and operation of the disc 16. Such a material likewise may be applied to portions of the casing 10 adjacent to the tapered rear end as shown in FIG. 9. The lubricating material may be selected from a group consisting of ultra-high-molecular-weight polyethylene, ultra-high-molecular-weight polyethylene foam, PET, metal sheet such as stainless steel and the like.

The remaining part of the modification may be constructed in substantially the same manner as the embodiment shown in FIGS. 1 to 6.

As can be seen from the foregoing, the present invention is constructed in the manner that the actuator is provided with the locking means for actuating the shutter and the movement transmission means or guide groove in which the operative connection means or guide pin of the disc receiver is fitted to operatively connect the disc receiver to the actuator so that the sliding of the actuator may cause the disc receiver to be approachably moved with respect to the disc to selectively receive a part of the disc therein. Also, in the present invention, the disc is rearwardly forced while being held at a state of floating in the space in the casing when the shutter is actuated to close the window, whereas the disc receiver is be positionally separated from the disc to cause the disc to operatively engaged with a disc driving mechanism of a disc player when the window is opened. Thus, when the disc cartridge is not charged in a disc player, the disc is kept substantially in noncontact with the casing to ensure the safety of a recording surface of the disc. Further, the actuator keeps the shutter locked when the disc cartridge is not used, to thereby prevent entrance of any dust into the disc cartridge and damage of the disc.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

What is claimed is:

1. A disc cartridge comprising:
   a casing comprising an upper cover plate and a lower cover plate joined together;
   a disc rotatably housed in said casing;
   a shutter for operating a window provided in said casing to insert a recording or reproducing head therethrough into said disc cartridge;
   an actuator movably arranged in said casing and engaged with said shutter to releasably lock said shutter; and
   a disc receiver movably arranged in said casing and operatively connected to said actuator whereby movement of said actuator, in turn, moves said disc receiver;
   said disc receiver receiving therein a part of a peripheral portion of said disc;
   said disc receiver being arranged to maintain said disc in a floating state, out of contact with inner surfaces of said upper and lower plates, when said cartridge is not in use;
   said actuator being arranged to be slidable in a longitudinal direction of said disc cartridge to cause said disc receiver operatively connected thereto to
   (i) approachably move to said disc, so that said disc receiver may be engaged with said disc to rearwardly force said disc while keeping said disc in noncontact with said plate surfaces when said shutter is actuated to close said window and when said actuator is slid in one direction, and
   (ii) move away from said disc and become disengaged from said disc when said shutter is actuated to open said window and said actuator is slid in an opposite direction;
   wherein a space defined in said casing is formed at a rear end portion thereof substantially into a V-shape; and
   wherein a disc holding material which exhibits lubricating properties is applied to said rear end portion of said casing.

2. A disc cartridge as defined in claim 1, wherein said disc receiver is pivotally moved due to sliding movement of said actuator to be approachable with respect to said disc.

3. A disc cartridge as defined in claim 2, wherein said actuator is provided with movement transmission means; and
   said disc receiver is pivotally mounted and provided with operative connection means engaged with said movement transmission means to transmit the sliding movement of said actuator to said disc receiver, so that it may be pivotally moved due to the sliding movement of said actuator to be approachable with respect to said disc.

4. A disc cartridge comprising:
   a casing comprising an upper cover plate and a lower cover plate joined together;
   a disc rotatably housed in said casing;

a shutter for operating a window provided in said casing to insert a recording or reproducing head therethrough into said disc cartridge;

an actuator movably arranged in said casing and engaged with said shutter to releasably lock said shutter; and a disc receiver movably arranged in said casing and operatively connected to said actuator whereby movement of said actuator, in turn, moves said disc receiver;

said disc receiver receiving therein a part of a peripheral portion of said disc;

said disc receiver being arranged to maintain said disc in a floating state, out of contact with inner surfaces of said upper and lower plates, when said cartridge in not in use;

said actuator being arranged to be slidable in a longitudinal direction of said disc cartridge to cause said disc receiver operatively connected thereto to (i) approachably move to said disc, so that said disc receiver may be engaged with said disc to rearwardly force said disc while keeping said disc in noncontact with said plate surfaces when said shutter is actuated to close said window and when said actuator is slid in one direction, and (ii) move away from said disc and become disengaged from said disc when said shutter is actuated to open said window and said actuator is slid in an opposite direction;

wherein said disc receiver is pivotally moved due to sliding movement of said actuator to be approachable with respect to said disc;

wherein said actuator is provided with movement transmission means; and said disc receiver is pivotally mounted and provided with operative connection means engaged with said movement transmission means to transmit the sliding movement of said actuator to said disc receiver, so that it may be pivotally moved due to the sliding movement of said actuator to be approachable with respect to said disc; and wherein said movement transmission means comprise a guide groove formed at said actuator and said operative connection means comprise a guide pin loosely fitted in said guide groove.

5. A disc cartridge as defined in claim 4 wherein said disc receiver is arranged to be vertically movable.

6. A disc cartridge as defined in claim 4, wherein said actuator is provided with locking means for releasably locking said shutter, said locking means carrying out locking of said shutter when it is actuated to close said window.

7. A disc cartridge as defined in claim 4, wherein said disc receiver is provided with a recess for receiving therein a part of a peripheral portion of said disc when said disc cartridge is not used.

8. A disc cartridge as defined in claim 7, wherein said recess of said disc receiver has an inlet portion formed into a vertically-enlarged shape.

9. A disc cartridge as defined in claim 4, wherein said shutter comprises a plate member of a U-shape fitted on said casing so as to be slidable along said upper and lower cover plates.

10. A disc cartridge as defined in claim 4, wherein a space defined in said casing is formed at a rear end portion thereof into a V-shape.

11. The cartridge of claim 4, additionally comprising two said actuators, and two said disc receivers, each said actuator engaged with a respective disc receiver maintaining said disc in the floating condition when the cartridge is not in use.

12. The cartridge of claim 4, wherein a recording surface section of said disc is maintained entirely out of contact with said casing by said disc receiver, during the nonuse.

13. The cartridge of claim 4, wherein said disc being supported by only said disc receiver between said plate surfaces, when said cartridge is not in use.

14. A disc cartridge comprising:

a casing comprising an upper cover plate and a lower cover plate joined together;

a disc rotatably housed in said casing;

a shutter for operating a window provided in said casing to insert a recording or reproducing head therethrough into said disc cartridge;

an actuator movably arranged in said casing and engaged with said shutter to releasably lock said shutter; and a disc receiver movably arranged in said casing and operatively connected to said actuator whereby movement of said actuator, in turn, moves said disc receiver;

said disc receiver receiving therein a part of a peripheral portion of said disc;

said disc receiver being arranged to receive said disc in a floating state, out of contact with inner surfaces of said upper and lower plates, when said cartridge is not in use;

said actuator being arranged to be slidable in a longitudinal direction of said disc cartridge to cause said disc receiver operatively connected thereto to (i) approachably move to said disc, so that said disc receiver may be engaged with said disc to rearwardly force said disc while keeping said disc in noncontact with said plate surfaces when said shutter is actuated to close said window and when said actuator is slid in one direction, and (ii) move away from said disc and become disengaged from said disc when said shutter is actuated to open said window and said actuator is slid in an opposite direction;

wherein said disc receiver is pivotally moved due to sliding movement of said actuator to be approachable with respect to said disc wherein said actuator is provided with movement transmission means; and said disc receiver is pivotally mounted and provided with operative connection means engaged with said movement transmission means to transmit the sliding movement of said actuator to said disc receiver, so that it may be pivotally moved due to the sliding movement of said actuator to be approachable with respect to said disc;

wherein said actuator is provided with locking means for releasably locking said shutter, said locking means carrying out locking of said shutter when it is actuated to close said window; and wherein said locking means comprise a hook-like member integrally formed at a front end of said actuator and securely engaged with said shutter.

15. A disc cartridge comprising:

a casing comprising an upper cover plate and a lower cover plated joined together and defining an internal space therein, said casing being formed with a window to insert a recording of reproducing head therethrough into said disc cartridge;

a disc rotatably housed in said space of said casing;

a shutter arranged to operate said window;

a disc receiver pivotally arranged in said casing to selectively receive a part of a peripheral portion of said disc, said disc receiver including a pivotally mounted portion on said casing, a receiver body formed with a recess for selectively receiving therein said part of said disc and operative connection means for initiating pivotal movement of said disc receiver, said disc receiver being arranged to maintain said disc in a floating state, out of contact with inner surfaces of said upper and lower plates, when said cartridge is not in use;

an actuator arranged in said casing to be slidable in a longitudinal direction of said disc cartridge and comprising locking means for releasably locking said shutter, actuating means through which said actuator is slided, and movement transmission means connected to said operative connection means of said disc receiver for transmitting sliding movement of said actuator to pivotally move said disc receiver;

whereby sliding movement of said actuator is transmitted to said disc receiver through said movement transmission means and operative connection means to cause said disc receiver to carry out pivotal movement so that (i) when said actuator is slid in one direction, said receiver body may approach said disc to receive said part of said disc in said receiver body and rearwardly force said disc while keeping said disc in noncontact with said surfaces when said shutter is actuated to close said window, and (ii) when said actuator is slid in an opposite direction, said receiver will separate from said disc to disengage said receiver body from said disc when said shutter is actuated to open said window; and wherein said locking means comprise a hook-like member integrally formed at a front end of said actuator and securely engaged with said shutter.

16. The cartridge of claim 15, additionally comprising
two said actuators, and
two said disc receivers,
each said actuator engaged with a respective disc receiver maintaining said disc in the floating condition when the cartridge is not in use.

17. The cartridge of claim 15, wherein a recording surface section of said disc is maintained entirely out of contact with said casing by said disc receiver, during the nonuse.

18. The cartridge of claim 15, wherein said disc being supported by only said disc receiver between said plate surfaces, when said cartridge is not in use.

19. The cartridge of claim 15, additionally comprising
a lateral cut-out through a side wall of said casing, through which said actuating means project, and
cover means integrally provided on said actuator for thoroughly covering said cut-out for preventing any dust from entering the casing through said cut-out.

20. The cartridge of claim 19, additionally comprising
two said cut-outs, each being provided through a respective side wall of said casing,
wherein said actuating means project through both said cut-outs and said cover means thoroughly cover both said cut-outs.

* * * * *